United States Patent [19]

Masuzawa et al.

[11] 3,886,422
[45] May 27, 1975

[54] SERVO APPARATUS

[75] Inventors: Isao Masuzawa, Tokyo; Shin-ichi Kawada, Yokohama; Yoichi Hirokawa, Kamakura; Masatoshi Sato, Tokyo, all of Japan

[73] Assignee: Kabushikikaisha Tokyo Keiki, Tokyo, Japan

[22] Filed: Jan. 28, 1974

[21] Appl. No.: 437,057

Related U.S. Application Data

[62] Division of Ser. No. 258,388, May 31, 1972, Pat. No. 3,793,576.

[52] U.S. Cl. .............................................. 318/621
[51] Int. Cl. ............................................. G05b 6/02
[58] Field of Search ..................................... 318/621

[56] References Cited
UNITED STATES PATENTS

| | | |
|---|---|---|
| 3,465,276 | 9/1969 | Silva et al. ................ 318/621 X |
| 3,614,633 | 10/1971 | Yalyshev et al. ............ 318/621 X |
| 3,656,043 | 4/1972 | Kawada ..................... 318/621 X |
| 3,673,512 | 6/1972 | Walters ..................... 318/621 X |

*Primary Examiner*—B. Dobeck
*Attorney, Agent, or Firm*—Hill, Gross, Simpson, Van Santen, Steadman, Chiara & Simpson

[57] ABSTRACT

A servo apparatus having a servo loop including in series and forwardly a power unit, a first device for achieving relay operation and for controlling the power unit, and a second device for controlling the first device. In this case, the second device is made to have lag characteristic when an input signal thereto increases, while is made to have characteristic stabilizing the servo loop when the input signal decreases to thereby decrease number of relay-like operations of the first device with keeping control accuracy of the servo loop.

6 Claims, 16 Drawing Figures

SERVO APPARATUS

This is a division, of application Ser. No. 285,388, filed May 31, 1972, now U.S. Pat. No. 3,793,576.

BACKGROUND OF THE INVENTION

1. Field of the Invention

This invention relates to a servo apparatus, and more particularly to a servo apparatus which is extremely long-lived.

2. Description of the Prior Art

Hitherto, there have been proposed various servo apparatus which forwardly include in a servo loop, devices performing the function equivalent to a relay such as a relay or a semiconductor element performing the function equivalent to the relay or a circuit of its application, a hydraulic or pneumatic solenoid valve, a clapper switch and a compound unit employing them. The first advantage of such servo apparatus is that all the power units which are made to be controlled by the same device performing relay operation are replaceable and, in servo systems of the same basic design, various servo motors such as DC, AC, hydraulic, pneumatic and like ones can be used and it is possible to prepare motors of various outputs ranging, for example, from 10W to 1HP.

The second advantage is that inexpensive, reliable and relatively long-lived apparatus can be obtained by replacing expensive, complicated and anreliable means for controlling a power unit with a durable actuator performing the function equivalent to a relay.

Typical examples of such servo system are a marine autopilot, a marine motor-driven hydraulic steering gear and so on.

Such servo system has a dead zone relative to substantially constant input which is determined by a dead zone of the actuator performing the function equivalent to a relay, so that if the servo system is designed to have a small dead zone sufficiently for practical use, the actuator accurately and finely responds to control order of low speed but the actuator also finely responds to control order of relatively high speed with substantially the same accuracy as that in the case of the control order of low speed. This inevitably causes a great increase in the number of operations of the actuator to result in shortening of its lifetime. Namely, this can be compared to the case where when required to hurry, a person whose step is constant extremely increases the number of steps per minutes and gets much tired.

SUMMARY OF THE INVENTION

The present invention has for its object to provide a servo apparatus which is free from the aforesaid defect and finely responds to control order of low speed with high accuracy as is the case with conventional servo apparatus but in which, when a control order of high speed is supplied, a change in the manipulated variable obtained with one operation of the actuator is automatically increased. Namely, the servo apparatus of this invention increases the step with an increase in the speed of control orders, that is, performs the operation resembling, for example, a foot racer who increases his step when required to hurry. This provides for extremely prolonged lifetime of the actuator thereby greatly to enhance reliability of the entire servo system.

DESCRIPTION OF THE PREFERRED EMBODIMENTS

Figure 1:
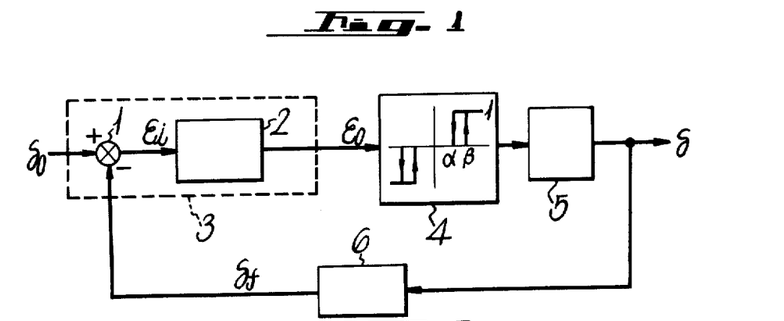
FIG. 1 is a block diagram showing a conventional servo system to which the present invention is applied.

With reference to FIG. 1 a description will be given first of an ordinary servo system forwardly including a relay-like actuator. In the FIGURE, a control order to the servo system and a manipulated variable are indicated by $\delta_0$ and $\delta$ respectively. The manipulated variable $\delta$ is converted by a signal converter 6 into a feedback signal $\delta_f$ of the same dimension as the instruction $\delta_0$. Reference numeral 1 indicates an adding point and 2 a control unit. The adding point 1 is supplied with the control order $\delta_0$ and a signal $-\delta_f$ which is opposite in sign to the manipulated variable $\delta$. An output signal from the adding point 1 is $\delta_0 - \delta_f$, that is, an error $\epsilon_i$, which is fed to the control unit 2. An output $\epsilon_0$ from the control device 2 is applied to a relay-like actuator 4. The relay-like actuator 4 provides a positive control order when the input $\epsilon_0$ thereto exceeds $+\beta$ and the positive control order is applied to a power unit 5 to drive it in a positive direction, causing an increase in the manipulated variable $\delta$ at a constant speed A. Accordingly, the feedback signal $\delta_f$ derived from the signal converter 6 is also increased. With an increase in the feedback signal $\delta_f$, $|\epsilon_i| = |\delta_0 - \delta_f|$ decreases and the output $\epsilon_0$ from the control device 2 also decreases and when the output $\epsilon_0$ becomes smaller than $+\alpha$ the relay-like actuator 4 stops producing the positive control order therefrom and the power unit 5 stops. In exactly the same manner, when the output $\epsilon_0$ becomes smaller than $-\beta$, the relay-like actuator 4 feeds a negative control order to the power unit 5 to drive it in a direction reverse to that in the above case. Further, when the output $\epsilon_0$ exceeds $-\alpha$, the power unit 5 stops. Thus, the manipulated variable $\delta$ always follows the control order $\delta_0$ and the loop shown in FIG. 1 makes up one servo system. S in the power unit 5 is an operator of the Laplace transformation and A/S a transfer function of the power unit 5.

In the case where the signal system is a voltage one, it is possible to use as the relay-like actuator 4 a relay or a relay amplifier performing the function equivalent thereto. In this case, the power unit 5 is formed with a motor and a gear train and the manipulated variable $\delta$ is a mechanical displacement. When a relay or a relay amplifier and a solenoid valve thereby controlled is used as the relay-like actuator 4, the power unit 5 is formed with a hydraulic or pneumatic servo motor, in which case the manipulated variable $\delta$ is also a mechanical displacement. In these cases, the signal converter 6 is formed with a potentiometer of the combination of a synchro and a demodulator combined thereto or the like, which is convenient for providing the feedback signal $\delta_f$ in the form of a DC voltage and, in this case, the control unit 2 may be a resistor network or a network including an operational amplifier. Further, there are some occasions when the adding point 1 is incorporated in the aforesaid network to make up one block 3 as indicated by a broken line in FIG. 1, although this is not directly related to this invention.

Figure 2:
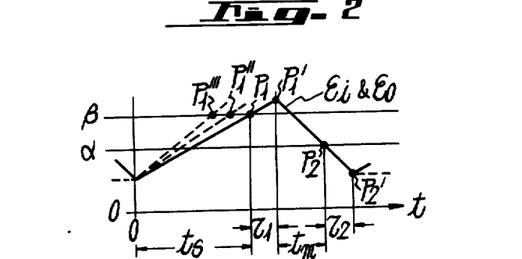
FIG. 2 is a graph for explaining the operation of the conventional servo system depicted in FIG. 1.
Figure 3A:
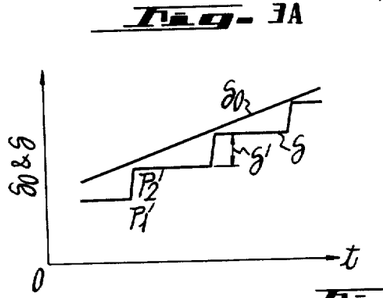
FIGS. 3A and 3B are graphs illustrating the relationship between a control order signal and manipulated variable in the conventional servo system of FIG. 1.

A discussion will be made in connection with the case where the control order to the servo system increases at a constant rate, that is, $\delta_0 = Bt$ (B being a constant and t time). FIG. 2 shows the error $\epsilon_i$ and the output $\epsilon_0$ relative to time. Let it be assumed that the control order $\delta_0$ and the feedback signal $\delta_f$ are both voltage signals, that the block 3 is a simple adding amplifier whose gain is taken as 1 for the sake of simplicity and that the relay-like actuator 4 is a relay. Therefore, it is possible to condider that $\delta_0 - \delta_f = \epsilon_i = \epsilon_0$. Assuming that the system is in its steady state and the moment of the power unit 5 stopping is a time $t = 0$, the error $\epsilon_i$ continues to increase by B every second with the lapse of time and reaches a point $P_1$ after $t_s$ second because the control order $\delta_0$ is Bt as shown in FIG. 2. At the point $P_1$ the equation $|\epsilon_i|=\beta$ is established, so that the relay 4 starts its operation. If the time until the power unit 5 starts to operate after initiation of movement of an armature of the relay 4 is regarded as a dead time and if this period of time is $\tau_1$ second, the power unit 5 begins to operate $\tau_1$ second after the point $P_1$ and the error $\tau_i$ begins to decrease. The period of time $\tau_1$ may be considered to be caused by inertia of the armature of the relay, movable parts of the servo motor and so on. Since the speed at which the output $\epsilon_0$ decreases is the difference between the increasing signal Bt and $\delta_0 = At$, the output $\epsilon_0$ decreases by A-B every second. In this case, A >> B and the gain of the signal converter 6 is selected to be 1 for the sake of simplicity. $t_m$ second after the power unit 5 starts its operation the error $\epsilon_i$ reaches a point $P_2$ where $|\epsilon_i|=\alpha$ holds. At this point, the relay 4 operates again for stopping the power unit 5 and the power unit 5 stops after a dead time $\tau_2$. So long as the relationship $\delta_0 = Bt$ continues to hold, the power unit 5 remains in its stopped state for $t_s + \tau_1$ seconds and the power unit 5 operates for $t_m + \tau_2$ seconds. The power unit 5 continues to repeat the above operations and the error $\epsilon_i$ and the output $\epsilon_0$ both repeat such changes as depicted in FIG. 2. Representing the above operations by a comparison of the control order $\delta_0$ with the manipulated variable $\delta$, the latter continues to follow the former in a stepwise manner as depicted in FIG. 3A. Points corresponding to those $P_1'$ and $P_2'$ are also indicated by $P_1'$ and $P_2'$ in FIG. 3A and in the time $t_m + \tau_2$ seconds therebetween the manipulated variable $\delta$ increases at a speed A.

In the servo system of this kind, a maximum value of the constant B is generally known according to purposes and the speed A is usually selected greater enough than an expected maximum value of the contant B so as to prevent the manipulated variable $\delta$ from becoming impossible to follow the control order $\delta_0$, so that, in order to accomplish the purpose, it is sufficient only to discuss the case where a relationship B << A holds. In the event that the constant B is gradually increased within the range where the relationship B << A holds, the error $\epsilon_i$ decreases at the speed (A − B) between the points $P_1'$ and $P_2'$ in FIG. 2 but this speed is substantially equal to the speed A because A >> B. Therefore, even if the constant B increases, the period of time $t_m$ little varies so long as the relationship A >> B holds. Accordingly, a change $\delta'$ in the manipulated variable corresponding to one operation of the relay shown in FIG. 3A scarcely varies with the increase in the constant B. However, $t_s$ is the time during which $|\epsilon_i|$ reaches $\beta$, so that the point $P_1$ sequentially varies in an order of $P_1''$ and $P_1'''$ with the increase in the constant B as will be apparent from FIG. 2. Namely, the period of time $t_s$ becomes rapidly short with the increase in the constant B.

Figure 3B:
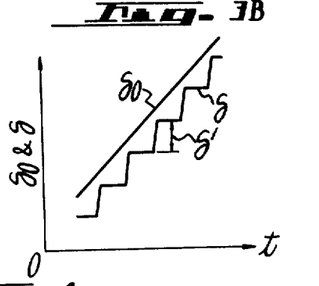

In FIG. 3B there is shown the relationship between the control order $\delta_0$ and the manipulated variable $\delta$ in the case of the constant B being increased. As will be seen from the foregoing description, only the period of suspension of the power unit 5 decreases but the change $\delta'$ in the manipulated variable hardly varies, so that the frequency or number of operation of the relay within a certain period of time T increases in proportion to the increase in the constant B, as compared with the case of FIG. 3A. This nature presents a problem such as high frequency of operation of the relay to shorten the lifetime of the relay itself in the servo system in which the control order $\delta_0$ varies variously as previously described.

Figure 4:
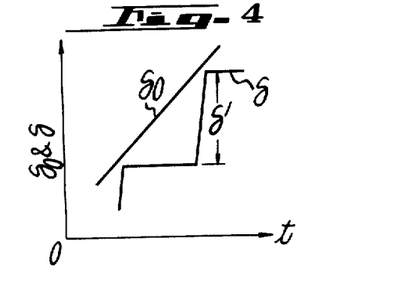
FIG. 4 is a graph showing the relationship between a control order signal and manipulated variable in a servo system of this invention.

Accordingly, the present invention is provide a servo system which is free from the aforesaid defect and in which when the constant B is extremely small the manipulated variable $\delta$ finely follows the control order $\delta_0$ with the same accuracy as in the conventional system, as depicted in FIG. 3A, but when the constant B increases the change $\delta'$ in the manipulated variable $\delta$ is automatically increased to cause the manipulated variable $\delta$ to follow the control order $\delta_0$, as shown in FIG. 4 in which the constant B is equivalent to that in the case of FIG. 3B, thereby to provide for extremely prolonged lifetime of the relay.

Figure 5:
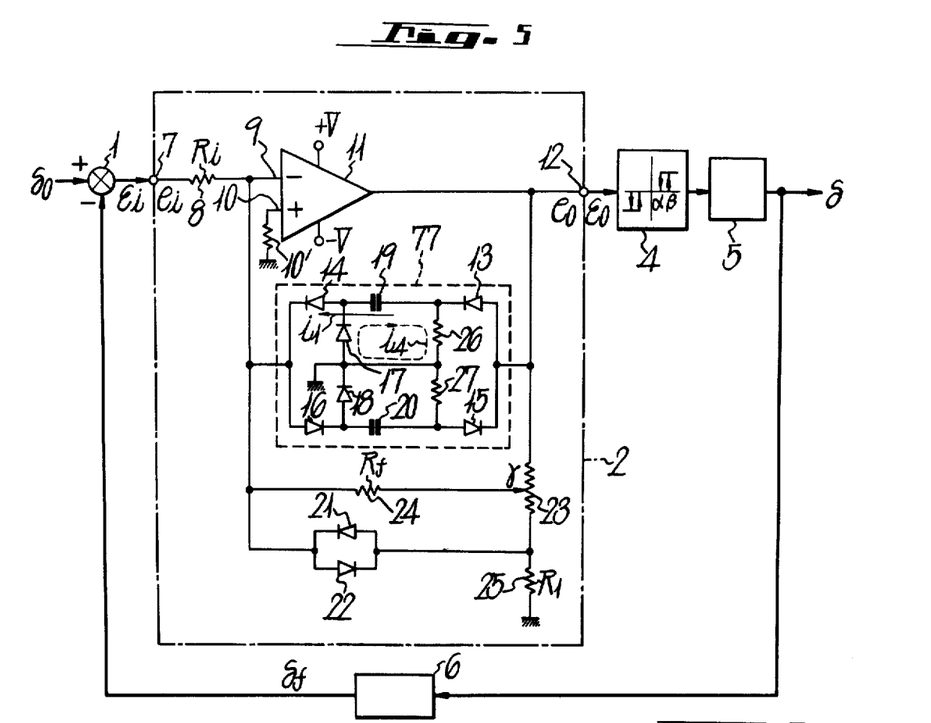
FIG. 5 is a circuit diagram showing the principal part of a servo apparatus of this invention.

Referring now to FIG. 5, one example of this invention will hereinafter be described. In the FIGURE reference numerals and characters corresponding to those in FIG. 1 designate the same elements as those in the latter. Since the example of this invention shown in FIG. 5 is substantially identical in construction with the example of FIG. 1 except the control unit 2, the following description will be given only of the control unit 2.

In the illustrated example, an input to the control unit 2 is a voltage corresponding to the error $\epsilon_i$ and an output therefrom is a voltage corresponding to that $\epsilon_0$. Reference numeral 11 indicates an operational amplifier, whose negative input terminal 9 is connected through an input resistor 8 to an input terminal 7 of the control unit 2. The input terminal 7 is supplied with the error $\epsilon_i$ from the adding point 1. While, a positive input terminal 10 of the operational amplifier 11 is grounded through a resistor 10'. An output terminal of the operational amplifier 11 is directly connected to an output terminal 12 of the control unit 2. Connected between the output terminal 12 and the negative input terminal 9 of the operational amplifier 11 is a network consisting of diodes 13, 14, 15, 16, 17 and 18, resistors 26 and 27 and capacitors 19 and 20.

Between the output terminal 12 and ground is connected a series circuit consisting of a potentiometer 23 and a resistor 25 and a resistor 24 is connected at one end to a sliding terminal of the potentiometer 23 and at the other end to the negative input terminal 9. Further, a diode couple consisting of diodes 21 and 22 is connected between the negative input terminal 9 and one end of the resistor 25, and the diode couple suppress an output voltage of the operational amplifier 11 when it tends to rise the saturation level of the operational amplifier. The resistance value $R_1$ of the resistor 25 is selected such that a current flowing in the diode couple is negligible during normal operation but this is not directly related to the present invention, and hence will not be described.

The following will describe the operation of the circuit of the control unit 2 in the servo system of this invention illustrated in FIG. 5.

Assuming that an input $e_i$ to the control unit 2 and an output $e_0$ therefrom are $e_i<0$ and $e_0>0$ respectively, the diodes 15 and 16 are supplied with a voltage in a backward direction, and hence are nonconductive. While, when the absolute value of the output $e_0$ decreases with the lapse of time, charge stored in the capacitor 19 is discharged with a decrease in the output $e_0$. This discharge current $i_4$ flows through the diode 17, so that it does not flow into the negative input terminal 9 of the operational amplifier 11. Namely, at the time of discharge, the diode 14 is nonconductive, and consequently a circuit 77 including the diodes 13 to 18, the capacitors 19 and 20 and the resistors 26 and 27 does not supply a feedback current to the negative input terminal 9 of the operational amplifier 11. The condition in which the circuit 77 does not supply any feedback current to the operational amplifier 11 will hereinafter be referred to as a mode II. In the mode II, a feedback circuit from the output terminal 12 of the operational amplifier 11 to the negative input terminal 9 thereof is only a circuit passing through the resistor 24. Accordingly, if the resistance value of the resistor 24 is taken as $R_f$ and if a voltage generated at the sliding terminal of the potentiometer 23 is taken as $\gamma e_0$, the following equation (1) holds.

$$e_i/R_i + \gamma e_0/R_f = 0 \qquad 1$$

where $e_0$ is a voltage corresponding that $\epsilon_0$ and $e_i$ a voltage corresponding to that $\epsilon_i$.

From the equation (1) the following equation (2) is obtained.

$$e_0 = - R_f/\gamma R_i\, e \equiv -K e_i \qquad 2$$

Namely, in the mode II, the circuit 77 performs the function of a proportional amplifier whose gain is K.

It will be understood that also in the case of $e_i>0$ and $e_0<0$, the equation (2) holds.

Next, a discussion will be made in connection with the case where the circuit 77 supplies a feedback current $i_1$ to the negative input terminal 9 of the operational amplifier 11. This state will hereinafter be referred to as a mode I. If, now, $e_i<0$ and $e_0>0$, a charging current flows to the capacitor 19. In other words, the mode I implies such a state that a charging current flows to the capacitor 19. In the mode I, the diodes 15 and 16 are nonconductive, so that the mode I is different from the mode II only in that the diodes 14 and 13 are conductive. Neglecting the internal resistances of the diodes 13 and 14 for the sake of brevity, a path passing through the diode 13, the capacitor 19 and the diode 14 serves as a feedback circuit. Here, $e_0>0$ and the output $e_0$ is increasing, so that the charging current $i_1$ flows from the output terminal 12 to the negative input terminal 9 through the diode 13, the capacitor 19 and the diode 14 because the diode 17 is nonconductive. If the capacitance of the capacitor 19 is taken as C, the charging current $i_1$ is given by the following equation (3).

$$1/C \int i_1 dt = e_0$$
$$i_1 = C\, de_0/dt \qquad 3$$

The charging current $i_1$ is a feedback current to the negative input terminal 9 of the operational amplifier 11.

While, if the gain of the operational amplifier is regarded as indefinite ($\infty$), the potential at the terminal 9 is always held zero, and consequently the following equation (4) holds.

$$e_i/R_i + \gamma e_0/R_f + i_1 = 0 \qquad 4$$

Substituting the equation (3) in the equation (4), it follows that $$(R_fC/\gamma \cdot de_0/dt + e_0) = - R_f/\gamma R_i e_1$$

Substituting $R_f/\gamma R_i \equiv K$ in the above equation and rewriting it in the form of Laplace transformation, the following equation (5) is obtained.

$$e_0 = -K/T_1 S + 1\, e_i \qquad 5$$

where $T_1 = KR_iC$.

The above equation (5) represents the operation of the circuit of FIG. 5 in the mode I. Namely, the output signal $e_0$ has a property of a first order lag relative to the input signal $e_i$.

When the input signal $e_i$ is positive and the output signal $e_0$ is negative, the diodes 14 and 13 are nonconductive but instead the diodes 15 and 16 are conductive, so that if the capacitance of the capacitor 20 is also C, the equation (5) holds, too.

As above described, in the mode I in which the absolute value of the input $e_i$ of the negative input terminal 9 of the operational amplifier 11 increases and the circuit 77 supplies the feedback current to the operational amplifier 11, the non-linear amplifier of this invention shown in FIG. 5, has a characteristic of the first order lag and in the mode II in which the absolute value of the input $e_i$ to the negative input terminal 9 of the operational amplifier 11 decreases and the circuit 77 does not supply the feedback current to the operational amplifier 11, the non-linear amplifier of this invention has a characteristic of a mere proportional amplifier.

A description will be given in connection with the case where the control unit 2 of FIG. 5 described above is used as that in FIG. 1. For convenience of explanation, $\epsilon_i = -e_i$ and $\epsilon = -e_0$, namely $K = 1$ in the following description, assuming that $\delta_0 = Bt$ and that one unit of the input $e_i$ corresponds to that of the error $\epsilon_i$. Accordingly, let it be assumed that the gain of the signal converter 6 is also 1.

Figure 6:
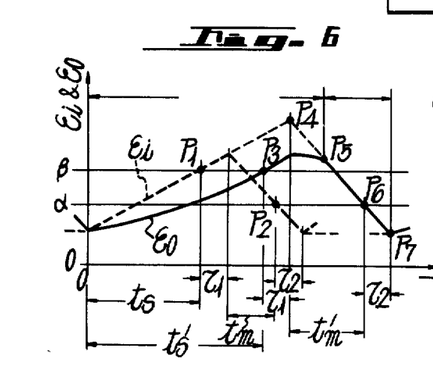
FIG. 6 is a graph for explaining the operation of the servo system employing the servo apparatus of this invention shown in FIG. 5.

With reference to FIG. 6, changes in the error $\epsilon_i$ and in the output $\epsilon_0$ are described respectively. In the FIGURE, the output $\epsilon_0$ and the error $\epsilon_i$ in the example of FIG. 5 relative to the constant B equal to that in FIG. 2 are indicated by a heavy solid line and a fine broken line respectively. If the moment of the power unit 5 stopping is taken as $t = 0$ as in FIG. 2, the error $\epsilon_i$ rises toward the point $P_1$ at a constant speed B as the moment $t$ is past 0. At this time, the voltage $e_i$ at the input terminal 7 in the example of FIG. 5 continues to vary in a negative direction, so that the output $e_0$ is positive. Accordingly, the operation of the mode I begins, so that the output $e_0$ presents the first order lag characteristic and greatly lags behind the error $\epsilon_i$ and reaches $\beta$ for the first time at a point $P_3 t_s'$ second after. Thereafter, the power unit 5 starts its operation after the dead time $\tau_1$. Consequently, the error $\epsilon_i$ reaches a point $P_4$ and then begins to decrease. The output $e_0$ still presents the first order lag characteristic thereafter and gradually decreases. However, when the output $e_0$ reaches a point $P_5$, $|e_0|$ which has been smaller than $|e_i|$ due to the first order lag becomes equal to the latter at last. At this point, the charging voltage of the capacitor 19 becomes equal to $|e_i|$, so that, as $|e_i|$ decreases thereafter, charge stored in the capacitor 19 is discharged with a decrease in $|e_0|$. Accordingly, the charging current no more flows and the diode 14 becomes nonconductive. Thus, the circuit 77 itself shifts to the mode II and the output $\epsilon_0$ coincides with the error $\epsilon_i$ and decreases together therewith and at a point $P_6$ the output $\epsilon_0$ becomes equal to $\alpha$ and $\tau_2$ second thereafter the power unit 5 stops at a point $P_7$. If the constant B of the control order $\delta_0$ is constant, the error $\epsilon_i$ and the output $\epsilon_0$ repeatedly undergo the changes depicted in FIG. 6. In the figure, the error $\epsilon_i$ and the output $\epsilon_0$ in FIG. 2 are shown by heavy chain lines for convenience of comparison. As will be apparent from this, in the example, of this invention illustrated in FIG. 5, the stopping period $t_s' + \tau_1$ of the power unit 5 is by far longer than that $t_2 + \tau_1$ in FIG. 2 and the period $t_m' + \tau_2$ is also by far longer than that $t_m + \tau_2$ in FIG. 2. Since this phenomenon is the result of utilization of the property "first order lag," little time lag is caused if the constant B is extremely small. Consequently, although accuracy does not ever differ from that in the prior art, the periods $t_s$ and $t_m$ automatically become equal to those $t_s'$ and $t_m'$ in FIG. 6 respectively and increase with an increase in the constant B and the manipulated variable $\delta$ and the control order $\delta_0$ vary as depicted in FIG. 4.

The use of the present invention greatly improves the frequency of operation of the relay to provide for remarkedly prolonged life time of the relay, solenoid valve, reed relay, a clapper switch or the like usually employed as the actuator 4 in FIG. 1, without lowering accuracy of the servo system.

The servo apparatus of the present invention is greatly featured in the mode I in which the control unit 2 shows the time lag characteristic and the mode II in which the unit 2 shows the proportional characteristic without any time lag. Since the control unit 2 has the time lag characteristic in the mode I, it is possible to lower the frequency of the relay operation to prolong the lifetime of the relay as above described. The control unit 2 does not show the time lag characteristic in the mode II for the following reason. Namely, when the time lag characteristic exists in the servo loop of the servo apparatus the loop generally tends to become unstable and if the frequency of the relay operation is lowered as much as possible, the servo loop readily becomes unstable to cause hunting. If sensitivity of the servo system is lowered so as to avoid the hunting, accuracy of the servo system is extremely deteriorated. With the servo apparatus of this invention, however, no time lag characteristic is present in the mode II, so that the servo loop remains stable and its accuracy is not ever lowered.

In the foregoing, the internal resistances of the diodes 13, 14, 15 and 16 in FIG. 5 are described to be negligible but if these internal resistances are not neglected, it is sufficient only to replace the equation (5) with following equation (6).

$$e_0 = -K \; T_2 S + 1/I_1 S + 1 \; e_i \qquad 6$$

where $T_2$ is a function between the diodes 13, 14 or 15, 16 and the capacitor 19 or 20. Since $T_2 << T_1$, the operation in the case of using the equation (6) is substantially the same as that in the case of using the equation (5). Accordingly, even if a resistor of a small resistance value exists in series with the diodes 14 and 16 in FIG. 5, it is in the range of application of the equation (6) and, also in this case, the purpose of this invention can be attained, so that it will be seen that this lies in the scope of the present invention.

After the aforesaid circuit has shifted from the mode I to the mode II, charge stored in the capacitor 19 is discharged through a loop of a series connection of the resistor 26 (with the resistance value Rd) and the diode 17 with a decrease in the output $e_0$.

The time constant Td of this circuit is as follows:

$$Td = RdC \qquad 7$$

It is added for caution's sake that the resistance value Rd is preferred to be selected sufficiently smaller than Ri and accordingly that the value RdC is a certain small value different from the time constant $T_1 = KRiC$ in the mode I.

Figure 7:
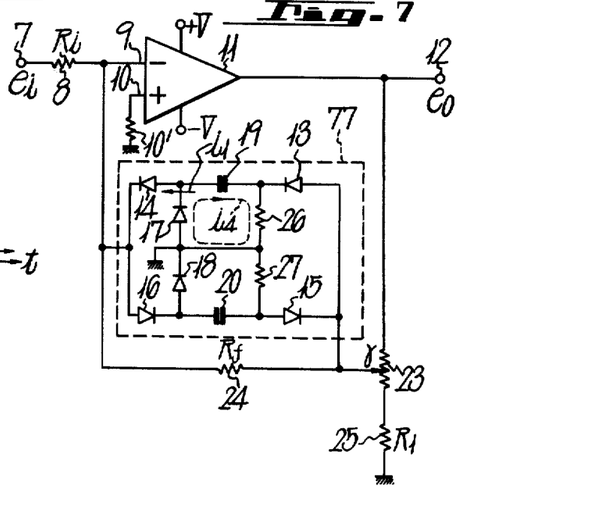
FIGS. 7 to 15 are circuit diagrams showing the principal parts of examples of the servo apparatus of this invention respectively.

FIG. 7 illustrates another example of this invention, showing only the portion corresponding to the control unit 2 of FIG. 5. The power unit 5, the actuator 4, the signal converter 6 and the adder 1, which are components of the servo apparatus, are identical with those in FIG. 5, and hence are not illustrated for the sake of brevity. In FIG. 7 parts corresponding to those in FIG. 5 are identified by the same reference numerals and characters. The example of FIG. 7 is different from that of FIG. 5 in that the connection point of the diodes 13 and 15 is connected not to the output terminal 12 of the operational amplifier 11 but to the sliding terminal of the potentiometer 23. Accordingly, the characteristic of the example of FIG. 7 in the mode I is expressed as follows:

$$e_0 = -K/T_1'S + 1 \; e_i \qquad 8$$

where $T_1' = R_f C$ and $K = R_f / \gamma R_i$.

A comparison of the equation (8) with that (5) expressing the characteristic of the example of FIG. 5 shows that the time constant of the first order lag in the characteristic of the example of FIG. 7 has no relation to the adjustment value $\gamma$ of the gain. This is a feature of the example of FIG. 7, which is exactly the same as that of FIG. 5 except this point. Of course, the both examples have the same characteristic in the mode II, which is expressed by the equation (2). Accordingly, the operations and effects of the servo apparatus depicted in FIG. 7 are the same as those described above in connection with the example of FIG. 5, so that no description will be repeated for the sake of brevity.

In the example of FIG. 7 and in those of FIGS. 8 to 15 described hereinbelow, the diodes 21 and 22 for output restriction purpose (refer to FIG. 5) are not described since they are not directly related to the present invention.

Figure 8:
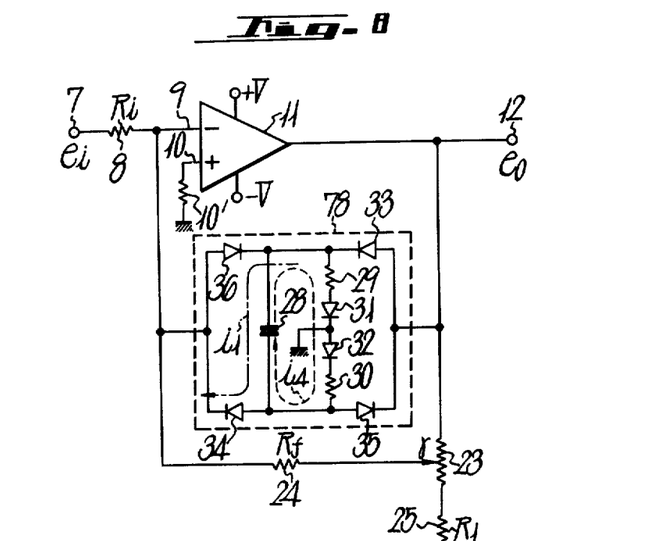

FIG. 8 shows another example of this invention, illustrating the part corresponding to the control unit 2 in FIG. 5. Since the power unit 5, the actuator 4, the signal converter 6 and the adder 1 which are components of the servo apparatus are identical with those in FIG. 5, they are not illustrated for the sake of simplicity. In FIG. 8, parts corresponding to those in FIG. 5 are indicated by the same reference numerals and characters. In the illustrated example, diodes 33 to 36 are connected between the negative input terminal 9 and the output terminal 12 of the operational amplifier 11 in the form of a bridge as depicted in the figure, a capacitor 28 is connected between those terminals of the bridge which are not connected to the operational amplifier 11 and a series circuit of a resistor 29 and a diode 31 and another series circuit of a resistor 30 and a diode 32 are connected between the connection points of the capacitor 28 with the bridge and ground respectively. A circuit 78 thus constructed is a replacement with the circuit 77 in the example of FIG. 5.

Now, the operation of the circuit 78 will be described. In the case of the mode I, if $e_i<0$ and $e_0>0$, the charging current $i_1$ for the capacitor 28 flows from the output terminal 12 to the negative input terminal 9 through the diode 33, the capacitor 28 and the diode 34. At this time, the diodes 35 and 36 remain nonconductive. If the internal resistances of the diodes 33 and 34 are neglected for the sake of brevity and if the capacitance of the capacitor 28 is taken as C, the charging current $i_1$ is exactly the same as that given by the equation (3) in the example of FIG. 5. Accordingly, the characteristic of the example of FIG. 8 in the mode I is exactly coincident with that of the example of FIG. 5 expressed by the equation (5). Further, it will be evident that in the case of $e_i>0$ and $e_0<0$, a similar current flows from the negative input terminal 9 to the output terminal 12 through the diode 36, the capacitor 28 and the diode 35 and that the equation (5) also holds.

The operation of the circuit 78 in the mode II is as follows. In the case of $e_i<0$ and $e_0>0$, charge stored in the capacitor 28 is discharged with a decrease in the output $e_0$ and the diodes 34, 35 and 36 remain nonconductive. The discharge current from the capacitor 28 flows in a closed circuit from the capacitor 28 through the resistor 29, the diode 31, the diode 32 and the resistor 30 back to the capacitor 28, so that no feedback current to the negative input terminal 9 of the operational amplifier 11 exists. Accordingly, the feedback current to the operational amplifier 11 flows only in a circuit passing through the resistor 24, and consequently the characteristic of the example of FIG. 8 in the mode II is exactly the same as that given by the equation (2) in the example of FIG. 5. Further, it will be seen that similar operations are also carried out in the case of $e_i>0$ and $e_0<0$.

As above described, the circuit shown in FIG. 8 has the same characteristic as that of the example of FIG. 5. Accordingly, the operations and effects of the example of FIG. 8 as a servo apparatus are exactly the same as those previously described in connection with FIG. 5 and no description will be repeated for the sake of brevity.

Figure 9:
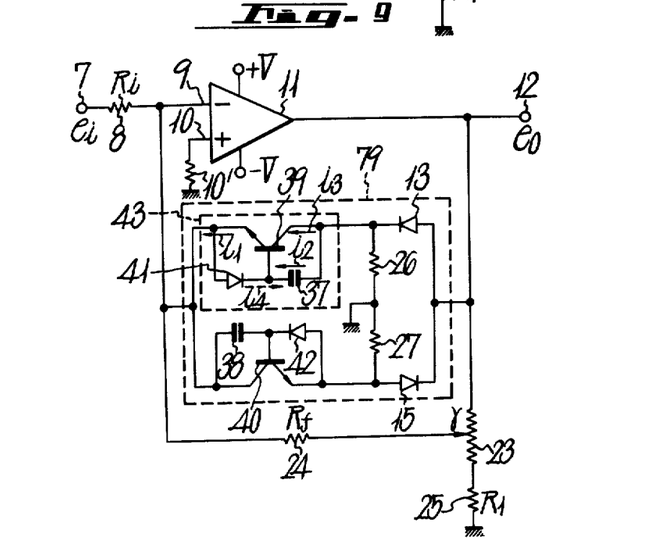

FIG. 9 shows another example of this invention, similarly illustrating only the part corresponding to the control unit 2 in FIG. 5. Since the other parts are all identical with those in FIG. 5, they are not illustrated. In FIG. 9, elements corresponding to those in FIG. 5 are designated by the same reference numerals and characters. In the present example, a circuit 79, which consists of diodes 13, 15, 41 and 42, resistors 26 and 27, transistors 39 and 40 and capacitors 37 and 38 connected as depicted, is connected between the output terminal 12 and the negative input terminal 9 of the operational amplifier 11 in place of the circuit 77 in FIG. 5.

The operation of the circuit 79 will hereinbelow be described. In the case of $e_i<0$ and $e_0>0$ in the mode I, the diode 13 is in the on state but the diode 15 in the off state. Accordingly, the transistor 39 is in the on state but the transistor 40 in the off state. The operation of the transistor 39 is as follows. The charging current $i_2$ for the capacitor 37 flows in a path from the output terminal 12 to the negative input terminal 9 through the diode 13, the capacitor 37, the base of the transistor 39 and the emitter thereof. If the capacitance of the capacitor 37 is taken as $C_1$ and if the forward voltage drop in the diode 13 and between the base and emitter of the transistor 39 are neglected for convenience of explanation, the base current $i_2$ is such as given by the equation (9).

$$i_2 = C_1 \, de_0/dt$$

9

Since the charging current $i_2$ is the base current of the transistor 39, a current $i_3$ flows in its collector. If the DC current gain of the transistor 39 is taken as $\beta$, the value of the current $i_3$ is as follows:

$$i_3 = \beta i_2$$

10

Consequently, the feedback current $i_1$ to the operational amplifier 11 which is produced by the circuit 79 is an emitter current of the transistor 39, so that it is given by the following equation (11).

$$i_1 = i_2 + i_3$$
$$= (1 = \beta)i_2$$
$$i_1 = (1 + \beta)C_1 \, de_0/dt$$

11

If $\beta$ and $C_1$ are selected so that the current $i_1$ may be equal to $i_1$ in the circuit of the example of FIG. 5, the following equation (12) is obtained from the equations (1) and (11).

$$C = (1 + \beta)C_1$$

12

The meaning of the equation (12) is as follows. Namely, in general, the DC current gain $\beta$ of the transistor is 50 to 300 and that of the transistor of Darlington connection is as high as above 10,000. Accordingly, even if the capacitance $C_1$ of the capacitor 37 is extremely small, it is equivalent to that C in the case of FIG. 5. Further, the DC current gain $\beta$ of the transistor varies with currents flowing therein but it is fully satisfactory in practical use, considering its mean or representative value in the working region of the transistor. When $e_i>0$, $e_0<0$ and the absolute value of the output $e_0$ is increasing, the diode 15 is in the on state, so that it is sufficient only to consider the operation of the transistor 40 and its operation is exactly the same as that in the case of $e_i<0$ and $e_0>0$ as will be apparent from the foregoing description. It will be seen from the foregoing description that the characteristic of the circuit 79 in FIG. 9 in the mode I is the same as that of the circuit 77 in FIG. 5 given by the equation (5).

Next, the operation of the circuit 79 in the mode II will be described. If, now, $e_i<0$ and $e_0>0$, electric charge stored in the capacitor 37 is discharged in a path from the negative input terminal 9 to ground through the diode 41, the capacitor 37 and the resistor 26 with a decrease in the output $e_0$ from the operational amplifier 11. At this time, $i_2 = 0$ and the transistor 39 is nonconductive. Since this discharge current $i_4$ flows through the negative input terminal 9 of the operational amplifier 11, it acts as a feedback current to the operational amplifier 11. However, the capacitance of the circuit at this time is only that $C_1$ of the capacitor 37 and this capacitance $C_1$ is extremely small as above described in connection with the mode I. Therefore, this current $i_4$ is extremely small and hardly exerts an influence on the characteristic of the circuit 79. Accordingly, the characteristic of the circuit 79 shown in FIG. 9 in the mode II is substantially coincident with that of the circuit of FIG. 5 in the mode II expressed by the equation (2).

Although the foregoing description has been given in connection with the case where $e_i<0$ and $e_0>0$, it will be understood that the same characteristic will also be obtained when $e_i>0$ and $e_0<0$.

As above described, the characteristic of the control unit depicted in FIG. 9 can be regarded as identical with that of the circuit shown in FIG. 5. Accordingly, the operations and effects of the example of FIG. 9 as a servo apparatus are the same as those previously described in connection with the example of FIG. 5 and no detailed description will be repeated for the sake of simplicity.

Figure 10:
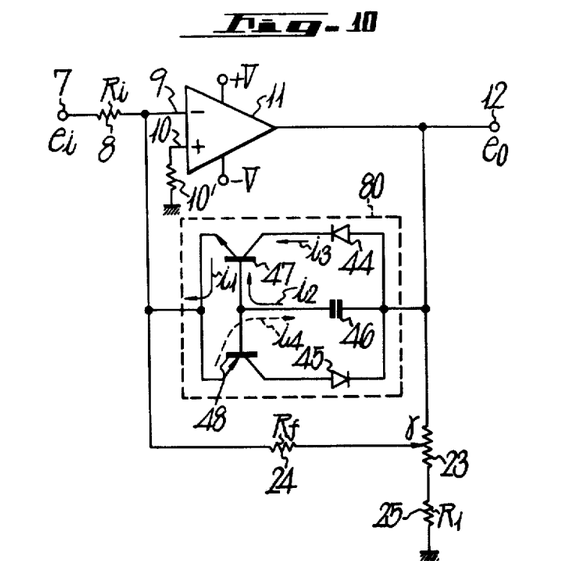

FIG. 10 illustrates another example of this invention, similarly showing only the part corresponding to the control unit 2 of the example depicted in FIG. 5. Since the other parts are all identical with those in the example of FIG. 5, they are not illustrated. In FIG. 10 elements corresponding to those in FIG. 5 are identified by the same reference numerals and characters.

The difference between the examples of FIGS. 10 and 5 resides in that a circuit 80 consisting of diodes 44 and 45, transistors 47 and 48 and a capacitor 46 connected as depicted is employed in place of the circuit 77 of the control unit 2 in the example of FIG. 5. The circuit 80 is constructed with less parts than that 79 of FIG. 9 but performs the same operations as those of the latter. A brief description will be given of the operation of this circuit 80. In the case of $e_i<0$ and $e_0>0$ in the mode I, the diode 44 is conductive but the diode 45 nonconductive, so that the transistor 47 is in the on state but the transistor 48 in the off state. At this time, the charging current $i_2$ for the capacitor 46 flows in a path from the output terminal 12 to the negative input terminal 9 through the capacitor 46 and the base and emitter of the transistor 47. This charging current $i_2$ is a base current of the transistor 47, by which a collector current $i_3$ of the transistor 47 is caused to flow and an emitter current $i_1$ of the transistor 47 becomes such that $i_1 = i_2 + i_3$. If the capacitance of the capacitor 46 is equal to that $C_1$ of the capacitor 37 in the example of FIG. 9, the emitter current $i_1$ is given by the equation (11) as is the case with the example of FIG. 9.

Further, it will be evident that, also in the case of $e_i>0$ and $e_0<0$, the current expressed by the equation (11) similarly flows.

Thus, since the operations of the example of FIG. 10 in the mode I are the same as those above described in connection with the example of FIG. 9, no description will be repeated.

Then, the operation of the circuit 80 in the mode II will be described. In the case of $e_i<0$ and $e_0>0$, electric charge stored in the capacitor 46 is discharged in a path from the negative input terminal 9 to the output terminal 12 through the emitter and base of the transistor 48 and the capacitor 46 with a decrease in the output $e_0$. Since this discharge current $i_4$ flows through the negative input terminal 9 of the operational amplifier 11, it serves as a feedback current to the operational amplifier 11. However, this current is extremely small as previously described in connection with the example of FIG. 9 and it has little influence upon the characteristic of the control unit 2. Accordingly, it might be said that the characteristic of the circuit 80 of FIG. 10 is the same as that of the circuit 79 of FIG. 9. Namely, the characteristic of the circuit 80 of FIG. 10 in the mode II is substantially coincident with that of the circuit of FIG. 5 expressed by the equation (2).

While the above description has been made in connection with the case where $e_i<0$ and $e_0>0$, it will be apparent that, also in the case of $e_i>0$ and $e_0<0$, similar operations are achieved.

As above described, the characteristic of the control unit depicted in FIG. 10 may be regarded as identical with that of control unit shown in FIG. 5. Consequently, the operations and effects of the example of FIG. 10 as a servo apparatus are the same as those described in connection with FIG. 5, and hence no description will be given.

Figure 11:
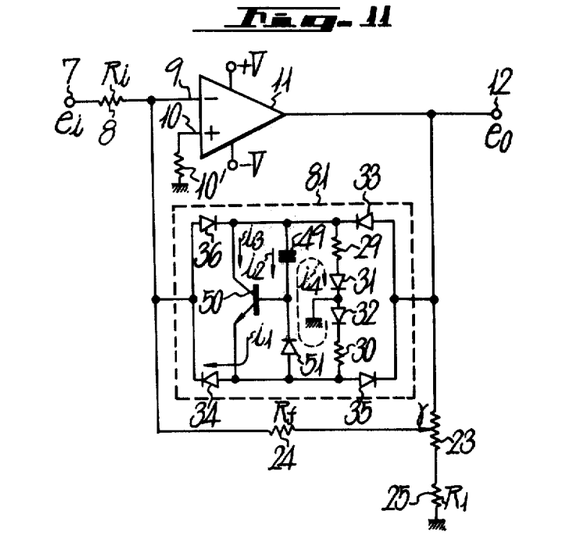

FIG. 11 shows another example of this invention, similarly illustrating only the part corresponding to the control unit 2 of the example of FIG. 5. Since the other remaining parts are identical with those in the example of FIG. 5, they are not illustrated. In FIG. 11 elements similar to those in FIG. 5 are indicated by the same reference numerals and characters.

The example of FIG. 11 is different from that of FIG. 5 mainly in that a circuit 81 consisting of diodes 33, 34, 35, 36, 31, 32 and 51, resistors 29 and 30, a transistor 50 and a capacitor 49 connected as illustrated is incorporated in place of the circuit 77 employed in the control unit 2 in the example of FIG. 5.

Now, the operation of the circuit 81 will be described. In the event of $e_i<0$ and $e_0>0$ in the mode I, the diodes 33 and 34 are in the on state but those 35 and 36 in the off state. At this time, the charging current $i_2$ for the capacitor 49 flows in a path from the output terminal 12 to the negative input terminal 9 through the diode 33, the capacitor 49, the base and emitter of the transistor 50 and the diode 34. Since this current $i_2$ is a base current of the transistor 50, a collector current $i_3$ flows and an emitter current $i_1$ ($=i_2 + i_3$) flows in the transistor 50. The emitter current $i_1$ is expressed by the equation (11) as is the case with the current $i_1$ previously described in connection with FIG. 9, if the capacitance of the capacitor 49 is taken as $C_1$. It will be understood that, also in the case of $e_i>0$ and $e_0<0$, similar results are obtained. Accordingly, it will be evident that the operation of the control unit shown in FIG. 11 in the mode I is identical with that of the control unit of the example of FIG. 9.

Further, if the capacitance $C_1$ of the capacitor 49 is selected to satisfy the equation (12), the same characteristic as that of the example of FIG. 5 is obtained.

Next, the operation of the circuit 81 in the mode II will be described. In the case of $e_i<0$ and $e_0>0$, electric charge stored in the capacitor 49 is discharged through a closed circuit from the capacitor 49 through the resistor 29, the diode 31, the diode 32, the resistor 30 and the diode 51 back to the capacitor 49 with a decrease in the output $e_0$. Since this discharge current $i_4$ does not flow through the negative input terminal 9 of the operational amplifier 11, it does not serve as a feedback current to the operational amplifier 11 and does not participate in the operation of the operational amplifier 11. Accordingly, the characteristic of the example of FIG. 11 in the mode II is same to that of the example of FIG. 5 expressed by the equation (2). Further, it will be seen that the same characteristic is also obtained in the case of $e_i>0$ and $e_0<0$.

As above described, the characteristic of the control unit depicted in FIG. 11 is the same as that of the control unit shown in FIG. 5. Accordingly, the operations and effects of the example of FIG. 11 are similar to those above described in connection with FIG. 5 and no description will be repeated.

In the examples of the present invention shown in FIGS. 5 and 7 to 11, the input $e_i$ has been described to correspond to the error signal $\epsilon_i$ because these examples correspond to the control unit 2 in FIG. 1. However, it is possible that an electric signal corresponding to the control order $\delta_0$ to the servo system and an electric signal corresponding to the feedback signal $\delta_f$ are supplied to the negative input terminal 9 of the operational amplifier 11 through resistors respectively. Namely, it will be evident that it is possible to adapt the circuit such that the function of the adding point 1 in FIG. 1 is performed by the negative input terminal 9 of the operational amplifier 11 of the control unit 2.

Moreover, in FIG. 5 the connection point of the diodes 13 and 15 is connected to the output terminal 12 but in FIG. 7 it is connected to the sliding terminal of the potentiometer 23 and it will be seen that this can also be effected in the examples of FIGS. 8 to 11.

Figure 12:
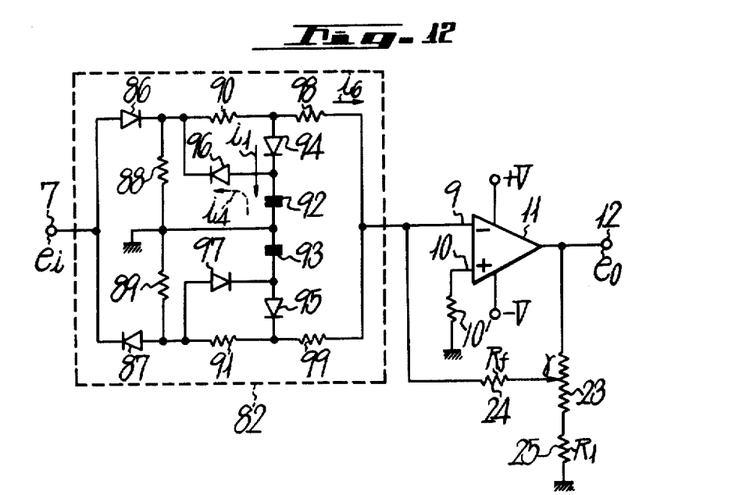

FIG. 12 illustrates another example of this invention, in which a circuit 82 for providing the non-linear lag characteristic is incorporated in an input circuit of the operational amplifier 11 although the non-linear lead circuits 77 to 81 are all inserted in the feedback circuit of the operational amplifier 11 to provide the non linear lag characteristic for the control unit 2 in the foregoing examples of FIGS. 5 and 7 to 11.

In the present example, the circuit 82 for producing the non-linear lag characteristic, which consists of diodes 86, 87, 94, 95, 96 and 97, resistors 88, 89, 90, 91, 98 and 99 and capacitors 92 and 93 connected as illustrated, is incorporated in the input circuit of the operational amplifier 11 and this example is identical in construction with the example of FIG. 5 except in that the circuit 77 for producing the non-linear lead characteristic is left out from the feedback circuit of the operational amplifier 11. The operation of the present example will be described in connection with the case where the input voltage $e_i$ is positive. In this case, the lower circuit portion of the input circuit 82, which consists of the diodes 87, 95 and 97, the resistors 89, 91 and 99 and the capacitor 93, has no relation to the operation of the present circuit because the diode 87 is in reverse biased condition. While, the diode 86 is biased in a forward direction and the upper circuit portion of the input circuit 82 performs the following operation. When the input voltage $e_i$ is positive and is increasing, the diode 94 is in the on state to flow the charging current $i_1$ to the capacitor 92. If a voltage drop at the diodes 86 and 94 is neglected, the resistance values of resistors 90 and 98 are taken as $R_{90}$ and $R_{98}$ and the capacitance of the capacitor 92 is taken as $C_{92}$, an input current $i_6$ to the operational amplifier 11 is given by the following equation.

$$i_6(S) = (e_i/R_{90} + R_{98}) \cdot (1/R_{90} \cdot R_{98}/R_{90} + R_{98}) C_{92}S + 1$$

13

While, since the feedback current to the operational amplifier 11 is $\gamma e_0/R_f$, the characteristic of this example in the mode I is expressed by the following equation (14).

$$e_0 = -K/T_5 S + 1 \; e_i$$

14 where $$K = R_f/\gamma R_i$$

$$R_i = R_{90} + R_{98}$$

$$T_5 = R_{90} \cdot R_{98}/R_{90} + R_{98} \, C_{92}$$

The equation (14) agrees with the equation (5) expressing the operation of the example of FIG. 5 in the mode I, if $T_5 = T_1$. Accordingly, the example of FIG. 12 has the same characteristic in the mode I as that of the example of FIG. 5.

Next, the operation of the illustrated example in the mode II will be described. In the event that the input voltage $e_i$ is positive ($e_i>0$) and is decreasing, when the input voltage $e_i$ becomes lower than the potential of the capacitor 92, the diode 96 is put in the on state to flow the discharge current $i_4$ from the capacitor 92 with a decrease in the input voltage $e_i$. At this time, the diode 94 is held in the off state, so that the input current to the operational amplifier 11 is $e_i/R_{90} + R_{98}$. Accordingly, the characteristic of this example in the mode II is given by the following equation (15).

$$e_0 = -R_f/\gamma(R_{90} + R_{98}) \, e_i = -K e_i$$

15

The above equation (15) coincides with the equation (2) expressing the characteristic of the example of FIG. 5 in the mode II. Namely, the example of FIG. 12 is identical in the characteristic in the mode II with the example of FIG. 5.

As above described, the example shown in FIG. 12 has the lag characteristic in the mode I but does not present or loses the lag characteristic in the mode II as is the case with the example depicted in FIG. 5. Therefore, the operations and effects of the example of FIG. 12 as a servo apparatus are similar to those previously described in connection with the example illustrated in FIG. 5.

In the circuit shown in FIG. 12 the adding point 1 is provided separately as shown in FIG. 5 but, for example, when the adding point 1 is an adding amplifier, an output therefrom is used as the input voltage $e_i$ of the present example. Further, the circuit depicted in FIG. 12 is of the type that gain adjustment $\gamma$ is achieved with the feedback circuit of the operational amplifier 11 but it will be evident that exactly the same characteristic as that of the example of FIG. 12 can be obtained with a circuit construction such that an amplifier is provided at the former stage for gain adjustment and an output therefrom is applied as an input to an amplifier employing as an input circuit thereof the non-linear lag circuit.

Figure 13:
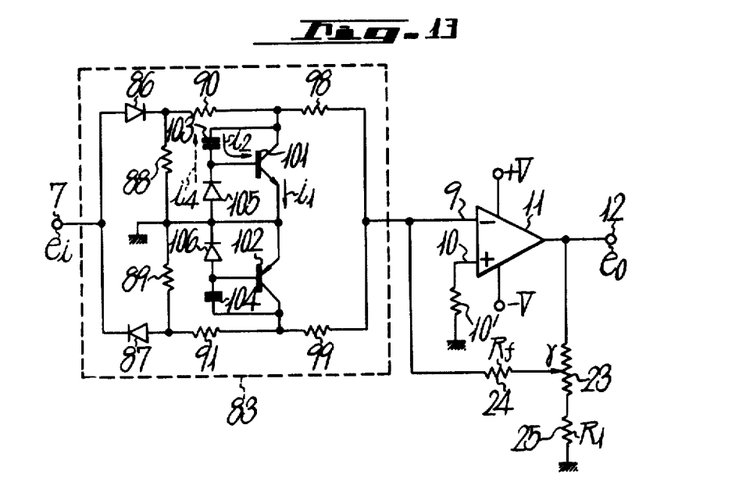

FIG. 13 shows another example of this invention in which the circuit for producing the non-linear lag characteristic is incorporated in the input circuit of the operational amplifier 11 as in the example of FIG. 12 and in which a circuit 83 is employed in place of the input circuit 82 used in the example of FIG. 12. The input circuit 83 consists of diodes 86, 87, 105 and 106, resistors 88, 89, 90, 91, 98 and 99, capacitors 103 and 104 and transistors 101 and 102 which are connected as illustrated. The operation of this example will be described during possitive input voltage ($e_i > 0$). The operation of the circuit consisting of the transistor 101, the capacitor 103 and the diode 105 is as follows. As previously described in connection with the example of FIG. 9, if the DC current gain of the transistor 101 and the capacitance of the capacitor 103 are taken as $\beta$ and $C_2$ respectively, when the charging current $i_2$ flows in the capacitor 103, this transistor circuit serves as a capacitor having a capacitance $(1+\beta)C_2$. The DC current gain $\beta$ is extremely large, so that even if the capacitance $C_2$ of the capacitor 103 is small, it becomes great equivalently and when the discharge current $i_4$ is flowing in the capacitor 103 this transistor circuit acts as only a small capacitor of capacitance $C_2$. Accordingly, the example of FIG. 13 presents the lag characteristic in the mode I and a characteristic with practically no lag in the mode II. The operations and effects of the example depicted in FIG. 13 as a servo apparatus are such as previously described in connection with the example of FIG. 5.

Figures 14, 15:
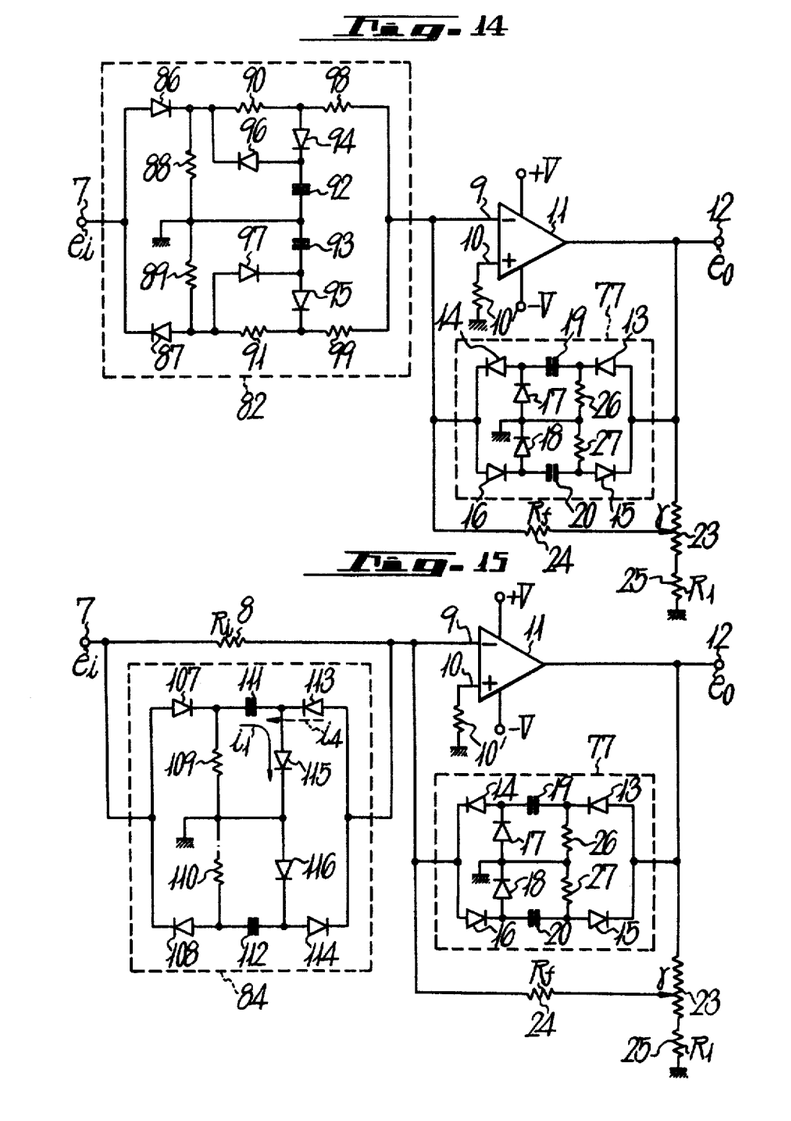

FIG. 14 illustrates another example of this invention in which the circuit 82 for producing the non-linear lag characteristic previously described in connection with the example of FIG. 12 is incorporated in the input circuit to the operational amplifier 11 shown in FIG. 5. It will be understood that the example of FIG. 14 also shows no lag characteristic in the mode II and lag characteristic in the mode I. The lag characteristic in this example is a second order lag and the effect of lag in the mode I becomes higher. Accordingly, the operations and effects of the example of FIG. 14 as a servo apparatus are similar to those obtainable with the example shown in FIG. 5.

The example of FIG. 14 employs the feedback circuit shown in FIG. 5 as the feedback circuit of the lag characteristic to the operational amplifier 11 but it will be seen that it is possible to use the feedback circuits of the examples of FIGS. 7 to 11. Further, the present example employs the input circuit 82 of the example of FIG. 12 as the input circuit but it is also apparent that the input circuit 83 in the example of FIG. 13 can be used as the input circuit of this example.

FIG. 15 shows still another example of this invention, in which a non-linear lead circuit 84 is connected in parallel with the input resistor 8 in the example depicted in FIG. 5. The circuit 84 consists of diodes 107, 108, 113, 114, 115 and 116, resistors 109 and 110 and capacitors 111 and 112 as illustrated. The operation of this example will be described in connection with the case where the input voltage $e_i$ is positive. When the input voltage $e_i$ is positive and is increasing, the charging current $i_1$ flows in the capacitor 111 of the circuit 84 but this current does not serve as an input current to the operational amplifier 11, so that the characteristic of this example is the same as that in the example of FIG. 5. Namely, the circuit in the example of FIG. 15 presents the lag characteristic in the mode I. When the input voltage $e_i$ is positive and is decreasing, the discharge current $i_4$ flows in the capacitor 111 through the negative input terminal 9 of operational amplifier 11 as shown in the figure. Since the value of the current $i_4$ is in proportion to the fluctuation rate of the input voltage $e_1$, the circuit 84 shows the lead characteristic. Then, the feedback circuit to the operational amplifier 11 as described in connection with FIG. 5 has no lag characteristic in the mode II. The circuit in the example of FIG. 5 performs the operation of the proportional amplifier in the mode II but as above described the circuit in the example of FIG. 15 presents the first order lead characteristic.

The lead characteristic serves to stabilize the servo loop without cancelling the lag characteristic in the mode I.

As above described, in the example of FIG. 15 the frequency of the relay operation is decreased with the mode I of the lag characteristic, thereby to prolong the lifetime of the relay. Further, the present example shows the lead characteristic in the mode II to ensure stabilization of the servo loop.

The example of FIG. 15 is identical with that of FIG. 5 except the input circuit 84 but it will be understood that the parts except the input circuit 84 may be those used in the examples of FIGS. 7 to 11.

Further, FIG. 15 shows the case in which the circuit for providing the lead characteristic is provided in the input circuit of the operational amplifier 11 and the circuit for producing the lag characteristic is inserted in the feedback circuit. However, it will be self-evident to those skilled in the art that similar characteristics and effects can be obtained with such a circuit construction that the circuit for producing the lag characteristic is incorporated in the input circuit of the operational amplifier 11 and the circuit for providing the lead characteristic is inserted in the feedback circuit.

Further, it will be apparent that the pair of diodes 21 and 22 employed for restricting the output voltage $e_0$ in the example of FIG. 5 (In the examples of FIGS. 7 to 15 this diode pair has no direct relation to the operation of the non-linear amplifier of this invention, so that they are not illustrated for the sake of brevity.) can be replaced with a known circuit consisting of a pair of Zener diodes or a pair of Zener diodes, a pair of diodes and a resistor.

It will be apparent that many modifications and variations may be effected without departing from the scope of the novel concepts of this invention.

We claim as our invention:

1. A servo apparatus comprising a drive unit for positioning a controlled element, a relay like actuator with its output connected to the input of said drive unit, a first feedback generator driven by said drive unit, a summing device receiving an input command signal and an input from said first feedback generator, an operational amplifier with its output connected to the input of said relay like actutor and its input connected to said summing device, a resistive feedback path connected between the output and input of said operational amplifier, a second feedback path device connected between the output and input of said operational amplifier and comprising a transistor and a capacitor, said capacitor being connected at its one terminal to the first electrode of said transistor and at its other terminal to the output of said operational amplifier, the second electrode of said transistor being connected to the input of said operational amplifier, and the third electrode of said transistor being connected through a unilateral current device to the output of said operational amplifier.

2. A servo apparatus as claimed in claim 1, wherein said second feedback path device further comprises a unilateral current device connected between said first and second electrodes of said transistor and a resistor between the ground and said third electrode of said transistor.

3. A servo apparatus as claimed in claim 1, wherein said second feedback path device further comprises a unilateral current device connected between the input of said operational amplifier and the third electrode of said transistor.

4. A servo apparatus as claimed in claim 1, wherein said second feedback path device further comprises a second transistor, a unilateral current device connected between the first and second electrodes of said transistor, a capacitor connected between the first and third electrodes of said transistor, a unilateral current device connected between the second electrode of said transistor and the output of said operational amplifier, and a resistor connected between the ground and the second electrode of said transistor, the third electrode of said transistor being connected to the input of said operational amplifier.

5. A servo apparatus as claimed in claim 1, wherein said second feedback path device further comprises a second transistor and a unilateral current device, the second electrode of said second transistor being connected to the input of said operational amplifier, the first electrode of said second transistor being connected to said capacitor at its one terminal, the other terminal of said capacitor being connected through said unilateral current device to the third electrode of said second transistor.

6. A servo apparatus as claimed in claim 1, wherein said second feedback path device further comprises second and third unilateral current devices and a second resistor, said second unilateral current device being connected between the input of said operational amplifier and the third electrode of said transistor, said third unilateral current device being connected between the second electrode of said transistor and the output of said operational amplifier, said second resistor beieng connected between the ground and the second electrode of said transistor.

* * * * *